US009747121B2

United States Patent
Kelly et al.

(10) Patent No.: US 9,747,121 B2
(45) Date of Patent: *Aug. 29, 2017

(54) PERFORMANCE OPTIMIZATION OF WORKLOADS IN VIRTUALIZED INFORMATION HANDLING SYSTEMS

(71) Applicant: Dell Products L.P., Round Rock, TX (US)

(72) Inventors: John Kelly, Dooradoyle (IE); Charles G. Morton, Cedar Park, TX (US); Munif M. Farhan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/686,429

(22) Filed: Apr. 14, 2015

(65) Prior Publication Data

US 2016/0306644 A1  Oct. 20, 2016

(51) Int. Cl.
  *G06F 9/455*  (2006.01)
  *G06F 9/46*   (2006.01)
  *G06F 15/173* (2006.01)
  *G06F 9/50*   (2006.01)

(52) U.S. Cl.
  CPC ........ *G06F 9/45558* (2013.01); *G06F 9/5044* (2013.01); *G06F 9/5077* (2013.01); *G06F 2009/45579* (2013.01)

(58) Field of Classification Search
  None
  See application file for complete search history.

(56) References Cited

U.S. PATENT DOCUMENTS

| 8,286,195 | B2  | 10/2012 | Finger |
| 8,689,227 | B2  | 4/2014  | Blanding |
| 9,396,028 | B2* | 7/2016  | Chen .................. G06F 9/5005 |
| 2007/0168244 | A1 | 7/2007 | Dan |
| 2007/0198982 | A1 | 8/2007 | Bolan |
| 2007/0240161 | A1 | 10/2007 | Prabhakar et al. |
| 2008/0270523 | A1 | 10/2008 | Parmar et al. |
| 2009/0100435 | A1 | 4/2009 | Papaefstathiou |
| 2011/0154353 | A1 | 6/2011 | Theroux et al. |
| 2011/0231899 | A1* | 9/2011 | Pulier ................ G06F 9/45558 709/226 |
| 2012/0192186 | A1 | 7/2012 | Bornstein |
| 2014/0108639 | A1 | 4/2014 | Nelke et al. |

(Continued)

OTHER PUBLICATIONS

International Search Report and Written Opinion, Application No. PCT/US2016/012317; 13 pages, Mar. 23, 2016.

(Continued)

*Primary Examiner* — Bing Zhao
(74) *Attorney, Agent, or Firm* — Baker Botts L.L.P.

(57) ABSTRACT

Methods and systems for performance optimization of workloads in virtualized information handling systems may analyze a workload at a virtual machine executing on a hypervisor. A workload policy specifying hardware resources for allocation to the virtual machine may be generated. After allocation of the hardware resources to the virtual machine, the workload may be executed on the virtual machine. The hypervisor may prioritize hardware resources among a plurality of virtual machines.

20 Claims, 4 Drawing Sheets

(56) References Cited

U.S. PATENT DOCUMENTS

| | | |
|---|---|---|
| 2015/0052536 A1* | 2/2015 | Sah .................. G06F 9/5083 718/105 |
| 2015/0066470 A1 | 3/2015 | Chopra |
| 2015/0169036 A1 | 6/2015 | Sodhi |
| 2016/0224377 A1 | 8/2016 | Farhan |
| 2016/0224381 A1 | 8/2016 | Farhan |
| 2016/0224382 A1 | 8/2016 | Farhan |
| 2016/0224394 A1 | 8/2016 | Farhan |

OTHER PUBLICATIONS

International Search Report and Written Opinion, Application No. PCT/US2016/012329; 12 pages, Apr. 15, 2016.

* cited by examiner

PERFORMANCE OPTIMIZATION OF WORKLOADS IN VIRTUALIZED INFORMATION HANDLING SYSTEMS

BACKGROUND

Field of the Disclosure

This disclosure relates generally to virtualized information handling systems, and more particularly, to performance optimization of workloads in virtualized information handling systems.

Description of the Related Art

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single physical server may instantiate multiple, independent virtual servers. Server virtualization is enabled primarily by a piece of software (often referred to as a "hypervisor") that provides a software layer between the server hardware and the multiple operating systems, also referred to as guest operating systems (guest OS). The hypervisor software provides a container that presents a logical hardware interface to the guest operating systems. An individual guest OS, along with various applications or other software executing under the guest OS, may be unaware that execution is occurring in a virtualized server environment (as opposed to a dedicated physical server). Such an instance of a guest OS executing under a hypervisor may be referred to as a "virtual machine" or "VM".

As the performance capability of hardware used in virtualized information handling systems has increased, many software components and architectures may not effectively utilize the performance capability of available hardware.

SUMMARY

In one aspect, a disclosed method is for optimizing workloads on virtualized information handling systems. The method may include receiving a workload request for a first virtual machine executing on a hypervisor executing on a virtualized information handling system. The workload request may specify a computing task for execution at the first virtual machine. The hypervisor may execute a plurality of virtual machines, including the first virtual machine. Based on the workload request, the method may include determining workload attributes of the computing task, the workload attributes including dependency of the computing task on hardware resources accessible to the hypervisor. The method may also include identifying the hardware resources available for allocation to the first virtual machine. Based on the workload attributes determined and the hardware resources identified, the method may include determining a workload policy for the computing task. The workload policy may specify the hardware resources used to execute the computing task at the first virtual machine. The method may further include implementing the workload policy at the first virtual machine, including allocating the hardware resources specified in the workload policy to the first virtual machine. The method may still further include executing the computing task at the first virtual machine in accordance with the workload policy.

In another aspect, at least one disclosed non-transitory computer readable medium, includes computer readable instructions for optimizing workloads on information handling systems, the instructions executable by a processor.

In yet another aspect, an information handling system is disclosed for optimizing workloads on information handling systems.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element collectively. Thus, for example, device "12-1" refers to an instance of a device class, which may be referred to collectively as devices "12" and any one of which may be referred to generically as a device "12".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and communicating with, for example, hard drives, network circuitry, memory devices, I/O devices, and other peripheral devices. For example, the hypervisor or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic and optical carriers, or any combination of the foregoing.

Particular embodiments are best understood by reference to FIGS. 1, 2, 3, and 4, wherein like numbers are used to indicate like and corresponding parts.

Figure 1:
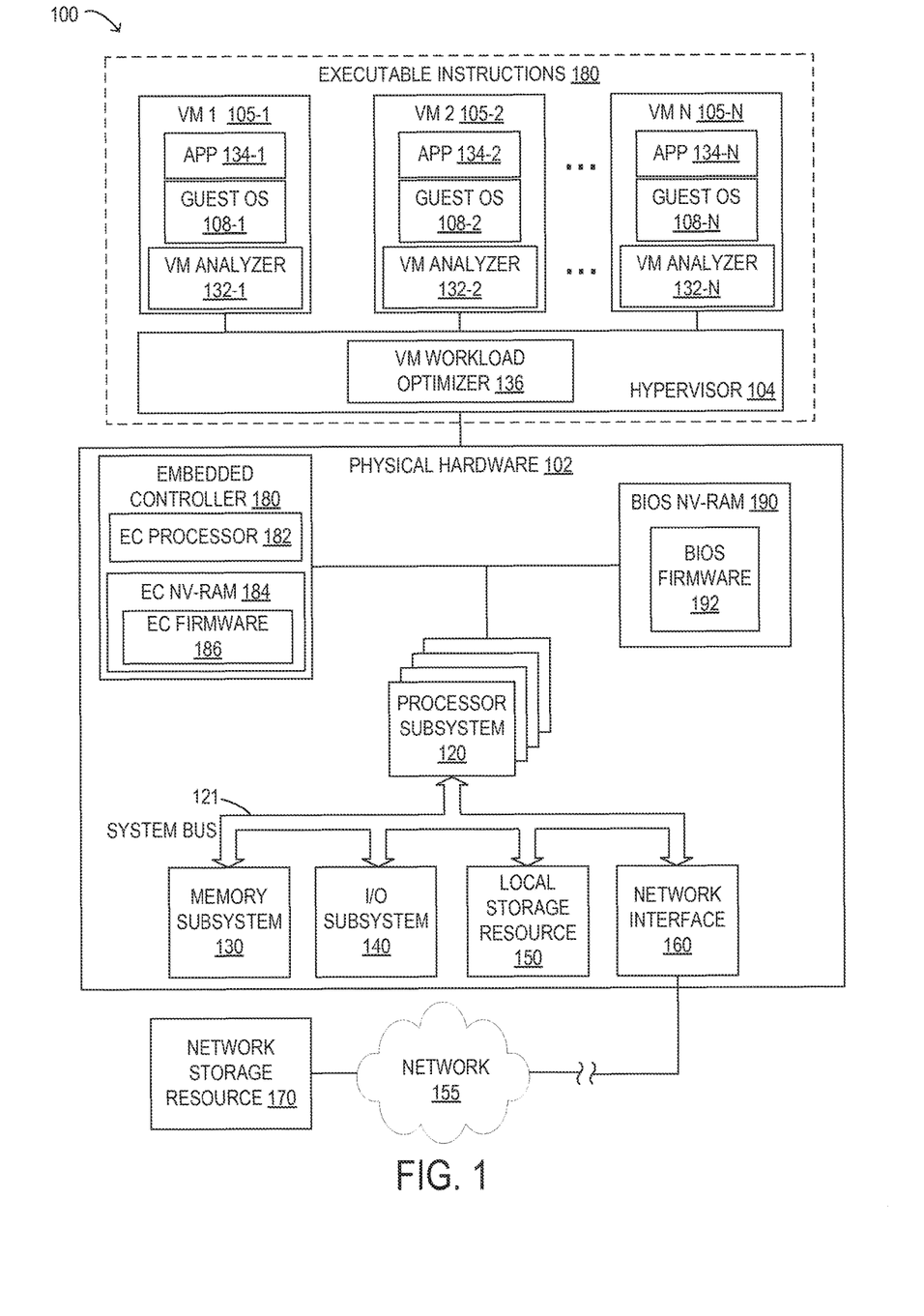
FIG. 1 is a block diagram of selected elements of an embodiment of a virtualized information handling system.

Referring now to the drawings, FIG. 1 illustrates a block diagram depicting selected elements of an embodiment of virtualized information handling system 100 for performance optimization of workloads, in accordance with the present disclosure. As depicted in FIG. 1, virtualized information handling system 100 represents an information handling system comprising physical hardware 102, executable instructions 180 (including hypervisor 104 and one or more virtual machines 105). Also shown with virtualized information handling system 100 are external or remote elements, namely, network 155 and network storage resource 170.

As shown in FIG. 1, components of physical hardware 102 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 is a suitable system, apparatus, or device operable to serve as an interface between virtualized information handling system 100 and a network 155. Network interface 160 enables virtualized information handling system 100 to communicate over network 155 using a suitable transmission protocol or standard, including, but not limited to, transmission protocols or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data or messages (generally referred to as data). Network 155 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, In certain embodiments, virtualized information handling system 100 and network 155 may be included in a rack domain.

As depicted in FIG. 1, processor subsystem 120 comprises a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret or execute program instructions and process data. In some embodiments, processor subsystem 120 may interpret or execute program instructions and process data stored locally (e.g., in memory subsystem 130 or another component of physical hardware 102). In the same or alternative embodiments, processor subsystem 120 may interpret or execute program instructions and process data stored remotely (e.g., in network storage resource 170).

Also in FIG. 1, memory subsystem 130 comprises a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage, or a suitable selection or array of volatile or non-volatile memory that retains data after power to an associated information handling system, such as virtualized information handling system 100, is powered down.

Local storage resource 150 comprises computer-readable media (e.g., hard disk drive, floppy disk drive, CD-ROM, or other type of rotating storage media, flash memory, EEPROM, and/or another type of solid state storage media) and is generally operable to store instructions and data. Likewise, network storage resource 170 comprises computer-readable media (e.g., hard disk drive, floppy disk drive, CD-ROM, or other type of rotating storage media, flash memory, EEPROM, or other type of solid state storage media) and may be generally operable to store instructions and data.

In virtualized information handling system 100, I/O subsystem 140 comprises a system, device, or apparatus generally operable to receive and transmit data to or from or within system 100. I/O subsystem 140 may represent, for example, any one or more of a variety of communication interfaces, graphics interfaces, video interfaces, user input interfaces, and peripheral interfaces. In certain embodiments, I/O subsystem 140 may comprise a touch panel or a display adapter. The touch panel (not shown) may include circuitry for enabling touch functionality in conjunction with a display (not shown) that is driven by display adapter (not shown).

Also shown in FIG. 1 is embedded controller (EC) 180, which may include EC processor 182 as a second processor included with virtualized information handling system 100 for certain management tasks. EC processor 182 may have access to EC non-volatile random access memory (NV-RAM) 184, which may store EC firmware 186, representing instructions executable by EC processor 182. Also shown is BIOS firmware 192, stored in BIOS NV-RAM 190, often simply or collectively referred to as the 'BIOS'. BIOS firmware 192 may represent pre-boot instructions executable by processor subsystem 120, for example, for preparing virtualized information handling system 100 to boot by activating various hardware components in preparation of launching an operating system or hypervisor 104 for execution. In some embodiments, BIOS firmware 192 may be executable by EC processor 182.

In FIG. 1, hypervisor 104 comprises software (executable code or instructions) and firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary or commercially available virtualization platforms, including, but not limited to, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP. In one embodiment, hypervisor 104 may comprise a specially designed operating system (OS) with native virtualization capabilities. In another embodiment, hypervisor 104 may comprise a standard OS with an incorporated virtualization component for performing virtualization. In another embodiment, hypervisor 104 may comprise a standard OS running alongside a separate virtualization application. In this embodiment, the virtualization application of hypervisor 104 may be an application running above the OS and interacting with physical hardware 102 only through the OS. Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, and as firmware running on physical hardware 102), also referred to as device pass-through. By using device pass-through, a virtual machine 105 may utilize a physical device directly without the intermediate use of operating system drivers. As a further alternative, the virtualization application of hypervisor 104 may, on various levels, interact directly with physical hardware 102 (e.g., similar to the way the OS interacts directly with physical hardware 102, and as firmware running on physical hardware 102) without utilizing the OS, although still interacting with the OS to coordinate use of physical hardware 102.

As shown in FIG. 1, virtual machine (VM) 1 105-1 represents a host for guest OS 108-1, virtual machine 2 105-2 represents a host for guest OS 108-2, and so on, up to virtual machine N 105-N representing a host for guest OS 108-N, where N is a desired integer having a value commensurate with the capabilities of physical hardware 102. To allow multiple operating systems to be executed on system 100 at the same time, hypervisor 104 may virtualize certain hardware resources of physical hardware 102 and present virtualized computer hardware representations to each of virtual machines 105. In other words, hypervisor 104 may assign to each of virtual machines 105, for example, one or more processors from processor subsystem 120, one or more regions of memory in memory subsystem 130, one or more components of I/O subsystem 140, etc. The virtualized hardware representation presented to each of virtual machines 105 may comprise a mutually exclusive (disjoint or non-overlapping) set of hardware resources per virtual machine 105 (e.g., no hardware resources are shared between virtual machines 105). In other embodiments, the virtualized hardware representation may comprise an overlapping set of hardware resources per virtual machine 105 (e.g., one or more hardware resources are shared by two or more virtual machines 105).

In one embodiment, hypervisor 104 may assign hardware resources of physical hardware 102 statically, such that certain hardware resources are assigned to certain virtual machines, and this assignment does not vary over time. As will be described in further detail herein, hypervisor 104 may assign hardware resources of physical hardware 102 dynamically, such that the assignment of hardware resources to virtual machines varies over time, for example, in accordance with the specific needs of the applications running on the individual virtual machines for performance optimization of workloads. Additionally or alternatively, hypervisor 104 may keep track of the hardware-resource-to-virtual-machine mapping, such that hypervisor 104 is able to determine the virtual machines to which a given hardware resource of physical hardware 102 has been assigned.

In FIG. 1, each of virtual machines 105 may respectively include an instance of guest operating system (guest OS) 108, along with applications 134, that may represent various different kinds of software running on guest OS 108. Each guest OS 108 may represent an OS compatible with and supported by hypervisor 104, even when guest OS 108 is incompatible to a certain extent with physical hardware 102, which is virtualized by hypervisor 104. In addition, each guest OS 108 may be a separate instance of the same operating system or an instance of a different operating system. For example, in one embodiment, each guest OS 108 may comprise a LINUX OS. As another example, guest OS 108-1 may comprise a LINUX OS, guest OS 108-1 may comprise a MICROSOFT WINDOWS OS, and while another guest OS on another virtual machine (not shown) may comprise a VXWORKS OS.

Also shown executing under guest OS 108 is VM analyzer 132, which may perform analysis of workloads executing on VM 105, such as usage of applications 134. VM analyzer 132 may provide results of workload analysis to VM workload optimizer 136, which may be installed as a driver or component within hypervisor 104. VM workload optimizer 136, in conjunction with VM analyzer 132 and hypervisor 104, may perform performance optimization of physical hardware 102 to enable each VM 105 to be allocated hardware resources that are optimally suited for executing workloads, such as applications 134.

In operation of virtualized information handling system 100 shown in FIG. 1, hypervisor 104 of information handling system 100 may virtualize the hardware resources of physical hardware 102 and present virtualized computer hardware representations to each of virtual machines 105. Each guest OS 108 of virtual machines 105 may then begin to operate and run applications and other software, representing a specific workload for virtual machine 105. While operating, each guest OS 108 may utilize one or more hardware resources of physical hardware 102 assigned to the respective virtual machine by hypervisor 104.

In operation, guest OS 108 and application 134 may be configured to execute on virtual machine 105. Because guest OS 108 or application 134 may not be optimized for a hardware configuration assigned to virtual machine 105, VM workload optimizer 136, in conjunction with VM analyzer 132 and hypervisor 104, may perform certain dynamic optimizations of the hardware configuration, as described in further detail herein. VM workload optimizer 136 may implement various dynamic optimizations using any one or more of hypervisor 104, EC firmware 186, EC processor 192, BIOS firmware 192, I/O subsystem 140, local storage resource 150, graphics interface 152, and network interface 160, among others resources or hardware resources associated with virtualized information handling system 100.

As virtual machine 105 executes a specific workload, VM analyzer 132 may determine certain optimizations of physical hardware 102 for the workload. VM analyzer 132 may accordingly generate workload information and report the workload information to VM workload optimizer 136. VM workload optimizer 136 may determine an impact resulting from whether or not a specific optimization is implemented, and may also take into consideration a priority or service level agreement associated with specific virtual machines 105. Then, VM workload optimizer 135 may implement certain performance optimization techniques, such as changing certain settings in BIOS NV-RAM 190 that govern operation of certain respective components in physical hardware 102. VM workload optimizer 136 may perform a placement process that assigns workloads of virtual machines 105 associated with similar optimizations on the same processor core or cores of processor subsystem 120. In certain instances, VM workload optimizer 136 may modify power management states, such as sleep states and operational states of processor subsystem 120, or individual cores of processor subsystem 120, in order to perform workload optimization for individual ones of virtual machines 105.

Figure 2:
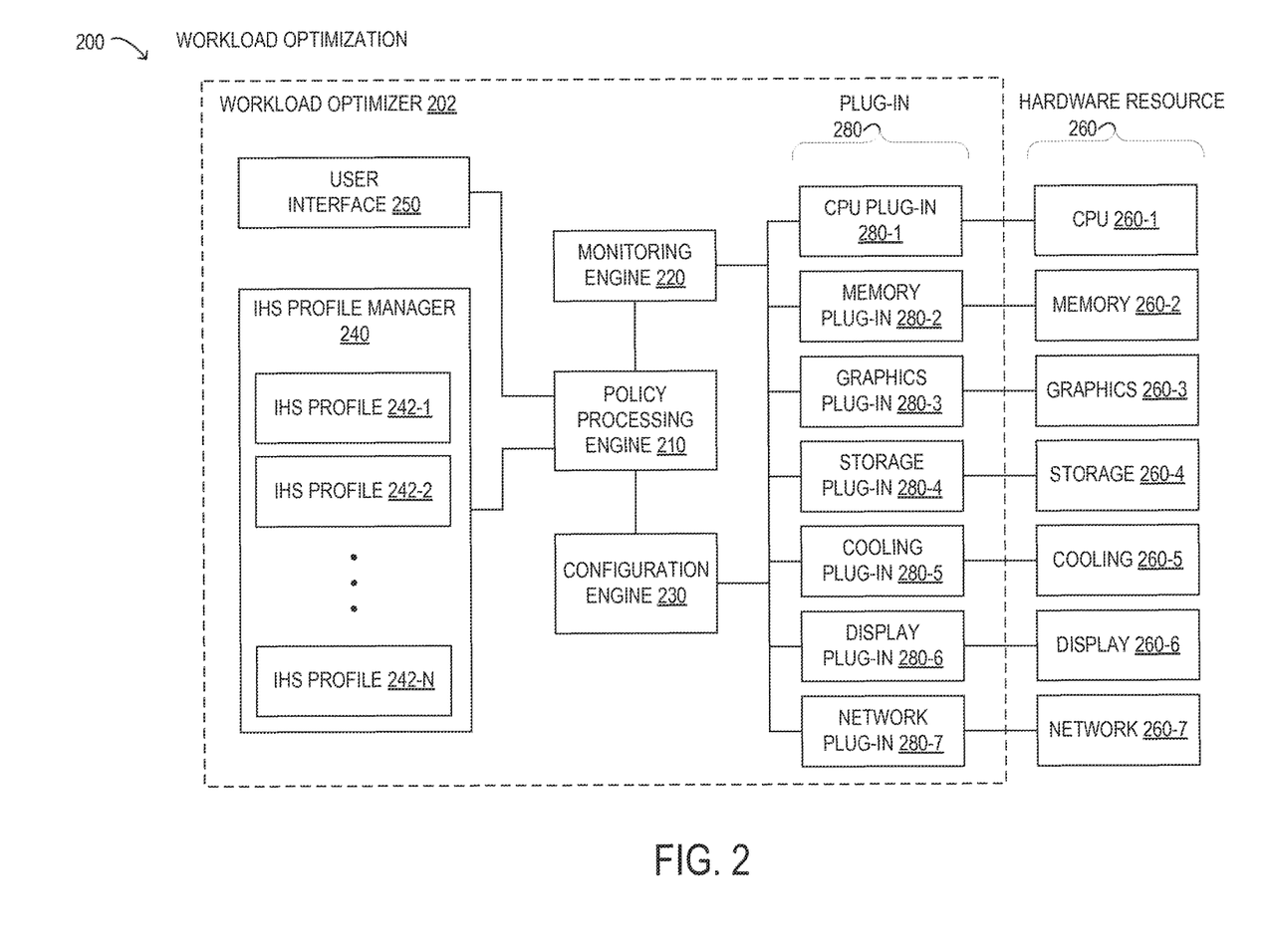
FIG. 2 is a block diagram of selected elements of an embodiment of a workload optimization.

Referring now to FIG. 2, a block diagram of an embodiment of a workload optimization 200, in accordance with some embodiments of the present disclosure, is illustrated. As shown, workload optimization 200 represents an architecture for workload optimization at virtualized information handling system 100 and virtual machines 105 discussed in FIG. 1. Workload optimization 200 may include any suitable combination or number of elements or modules to perform the functionality described herein. As shown in FIG. 2, workload optimization 200 includes workload optimizer 202 and hardware resources 260. Workload optimizer 202 may represent an embodiment of VM workload optimizer 136 and VM analyzer 132 shown in FIG. 1. As shown, workload optimizer 202 includes a policy processing engine 210, monitoring engine 220, configuration engine 230, IHS profile manager 240, a user interface 250, and plug-ins 280. Workload optimizer 202 may monitor and configure hardware resources on virtualized information handling system 100 or virtual machine 105. Hardware resources 260 represent certain hardware elements or components, including components described with respect to virtualized information handling system 100 in FIG. 1.

In workload optimization 200, workload optimizer 202 includes policy processing engine 210. Policy processing engine 210 may be implemented in any suitable manner. For example, policy processing engine 210 may be implemented by code, instructions, libraries, shared libraries, software-as-a-service, functions, applications, scripts, or executables. Although illustrated as a single element in FIG. 2, policy processing engine 210 may be implemented through a combination of elements. In some embodiments, policy processing engine 210 may be configured to optimize workloads executing on one or more virtual machines.

In some embodiments, policy processing engine 210 may be used to optimize a workload that is executed at a virtual machine by configuring hardware resources 260 to operate in a manner that is specifically matched to attributes of the workload. User interface 250 represents a user interface that a user may operate to use policy processing engine 210, for example, to specify the workload or to select a profile used to implement a particular workload policy.

Policy processing engine 210 may analyze and act in accordance with one or more IHS profiles 242 maintained and managed by IHS profile manager 240. In certain embodiments, IHS profiles 242 may be selected, created, modified, and removed from IHS profile manager 240 by the manufacturer of the virtualized information handling system or hardware resource 260. For example, the manufacturer of a computer system may provide IHS profile 242 for conserving power consumption. In particular embodiments, IHS profile 242 may be selected, created, modified, and removed from IHS profile manager 240 by policy processing engine 210. For example, policy processing engine 210 may select IHS profile 242 for conserving power upon detecting that a computer system has been unplugged from a power source. In some embodiments, IHS profile manager 240 may be an application configured to manage profiles 242 and communicate profile information to policy processing engine 210.

As shown, IHS profile manager 240 may include IHS profiles 242-1, 242-2, and so on, up to 242-N representing N number of profiles where N is any desired number. The IHS profiles 242 may be received by policy processing engine 210 and used to implement a particular workload policy. IHS profiles 242 may accordingly include policy information, such as execution scenarios with particular configurations (or settings) of hardware components, as represented by hardware resources 260. It is noted that hardware resources 260 may represent resources assigned or allocated to individual ones of virtual machines 105 in FIG.

1. IHS profiles 242 may be specific to a user, a type of usage of the virtual machine, or an application executing on the virtual machine, among other examples. IHS profile manager 240 may be enabled to store, retrieve, create, delete, add, and modify IHS profiles 242 on a local or a remote storage, for example, in response to user input received via user interface 250. In certain embodiments, IHS profile manager 240 operates in a distributed manner across a network.

Policy processing engine 210 may monitor various hardware resources 260 of the virtualized information handling system. For example, policy processing engine 210 may be communicatively coupled to monitoring engine 220, thereby receiving monitored information on one or more hardware resources 260 via a respective plug-in 280. Monitoring engine 220 may be implemented in any suitable manner, such as by code, instructions, libraries, shared libraries, software-as-a-service, functions, applications, scripts, or executables. Although illustrated as a single element, monitoring engine 220 may be implemented through a combination of elements. In some embodiments, monitoring engine 220 may be configured to monitor hardware resources of more than one virtualized information handling system or virtual machine.

In certain embodiments, at least some functionality of monitoring engine 220 may be provided by VM analyzer 132 (see FIG. 1). For example, VM analyzer 132 may monitor an operational state of at least some of the hardware resources, including monitoring which hardware resources are allocated to each of a plurality of virtual machines executing on the virtualized information handling system. Then, allocation of the hardware resources to individual virtual machines may be performed based on the operational state.

Policy processing engine 210 may actively configure (or change settings for) various hardware resources 260 of the virtualized information handling system. For example, policy processing engine 210 may be communicatively coupled to configuration engine 230, to configure hardware resources 260 according to a workload policy via a respective plug-in 280. Configuration of hardware resources 260 may be implemented in various ways by plug-in 280. For example, plug-in 280 may directly access BIOS NV RAM 190 to change a setting used by BIOS firmware 192. Plug-in 280 may access or communicate with EC 180 to change a hardware setting. Plug-in 280 may further access, or may include, hardware drivers, such as operating system drivers for individual ones of hardware resources 260. Configuration engine 230 may be implemented in any suitable manner. For example, configuration engine 230 may be implemented by code, instructions, libraries, shared libraries, software-as-a-service, functions, applications, scripts, or executables. Although illustrated as a single element, configuration engine 230 may be implemented through a combination of elements. In some embodiments, configuration engine 230 may configure hardware resources at more than one virtual machine.

Plug-in 280 may represent modular code that is installed in workload optimizer 202 for accessing particular hardware resources 260. Accordingly, each plug-in 280 may be specific to a particular hardware resource 260 as well as being specific to workload optimizer 202. Each one of plug-in 280 may include monitoring and configuration functionality that may be implemented separately or may be combined. In other words, plug-in 280 may enable independent operation of monitoring engine 220 and configuration engine 230. As hardware resources 260 are added, removed, updated, replaced, etc., a corresponding plug-in 280 may be added, removed, updated, replaced, etc. As shown, CPU plug-in 280-1 may provide monitoring and configuration support for CPU 260-1, which may represent a processor or a processor subsystem; memory plug-in 280-2 may provide monitoring and configuration support for memory 260-2, which may represent a main memory accessible to CPU 260-1; graphics plug-in 280-3 may provide monitoring and configuration support for graphics 260-3, which may represent a graphics interface or a graphics processing unit; storage plug-in 280-4 may provide monitoring and configuration support for storage 260-4, which may represent a local or a remote storage resource; cooling plug-in 280-5 may provide monitoring and configuration support for cooling 260-5, which may represent a thermal control system; display plug-in 280-6 may provide monitoring and configuration support for display 260-6, which may represent one or more display devices, for example, coupled to graphics 260-3; and network plug-in 280-7 may provide monitoring and configuration support for network 260-7, which may represent any one or more network interfaces. It is noted that plug-ins 280 and hardware resources 260 described are exemplary and may include other elements in various embodiments.

In operation, policy processing engine 210 may receive a workload request, such as from a user via user interface 250. The workload request may specify a computing task, such as a computing task executed by application 134. The workload request may include an indication of a particular one of IHS profile 242. Alternatively, policy processing engine 210 may select one of IHS profile 242 based on other information, such as the user (or user account) or application 134 in various embodiments. In certain embodiments, application 134 itself may include functionality for generating a workload request or executing computing tasks using policy processing engine 210. In some embodiments, at least certain portions of workload optimizer 202 are included in VM workload optimizer 136.

Based on the workload request, policy processing engine 210 may determine workload attributes of the computing task. The workload attributes may include dependencies of the computing task on hardware resources 260. For example, when the computing task includes multithreading, activation of multiple cores within a CPU, when available, may be desirable. Alternatively, when the computing task executes within a single thread, the computing task may execute most efficiently when sent to a single core within a CPU, which may be desirable. Accordingly, the workload attributes may specify any one or more of a degree of multithreading, a thread priority, and an instruction set architecture. The workload attributes may specify any one or more of a desired processor frequency, processor cache capacity, processor cache architecture, processor cache throughput, memory capacity, memory bus speed, memory throughput, and usage of a non-uniform memory architecture, for example. The workload attributes may specify a desired degree of background execution or a tolerable network latency, for example. The workload attributes may further specify any one or more of a desired storage capacity, a minimum storage available, a storage data throughput, and a storage latency. The workload attributes may also specify any one or more of a degree of acceleration by a graphics processing unit, a vertical synchronization setting, a degree of digital signal processing, a degree of integer processing, a degree of background execution, and an operating system, among other desired attributes for the workload.

Then, policy processing engine 210 may identify specific ones of hardware resources 260 present at the virtualized information handling system, for example, via monitoring engine 220. In addition, policy processing engine 210 may monitor an operational state of at least some of hardware resources 260 in order to determine which configuration changes are indicated by the workload attributes, or which configuration settings are already commensurate with the workload attributes. Hardware resources 260 may include any one of a variety of resources, including resources depicted in FIG. 2. Specifically, hardware resources 260 may include aspects such as a number of processor cores available, a degree of exclusive access to processor cores available, a degree of processor multithreading available, a degree of background execution available, a degree of user mode execution available, a processor frequency, a processor architecture, a processor cache architecture, a processor power state, a processor cache capacity available, a processor power consumption available, and an instruction set architecture available. Other hardware resources 260 may include aspects such as a graphics processing unit available, a memory capacity available, a memory throughput available, a degree of non-uniform memory access available, a storage capacity available, a storage throughput available, and a storage latency available. Still other hardware resources 260 may include aspects selected from a network capacity available, a network throughput available, a network latency available, a system reboot feature, and a system power down feature. Other aspects related to hardware resources 260 are also contemplated.

Next, based on the workload attributes and hardware resources 260, policy processing engine 210 may determine a workload policy for the computing task. The workload policy may be based on one of IHS profile 242, as noted above. The workload policy may specify hardware resources 260 used to execute the computing task, such as by specifying specific settings for aspects of identified hardware resources 260.

After determining the workload policy, policy processing engine 210 may implement the workload policy, for example, using configuration engine 230 to access plug-in 280, as noted above. Implementing the workload policy may involve various operations in different embodiments, such as reconfiguring internal or external hardware components. In some embodiments, the virtual machine may be rebooted or restarted to implement a certain workload policy before the computing task is executed. When the workload policy is implemented, the computing task may be executed by the virtual machine. It is noted that executing the computing task may involve long term operations, such as for a duration that a particular application is used by the user.

In some embodiments, an operational state of the hardware resources may indicate that the hardware resources specified in the workload policy are not available for allocation to a first virtual machine, for example, when other virtual machines have been allocated the hardware resources specified in the workload policy for the first virtual machine. In this case the workload policy may be modified according to the operational state. Furthermore, VM workload optimizer 136 may generate a hierarchy of operational states of the hardware resources. For example, VM workload optimizer 136 may generate the hierarchy of operational states for each virtual machine executing on the virtualized information handling system, and for each of the hardware resources. The hierarchy of operational states may be ordered based on a performance level or performance benefit of each of the hardware resources. In other words, the hierarchy of operational states may list hardware resources for each virtual machine based on a performance benefit of each of the hardware resources. The hierarchy of operational states may indicate a tolerance of each virtual machine to variances in the dependency of the computing task on the hardware resources. In this manner, certain virtual machines may have a low tolerance to a non-optimal allocation of the hardware resources, while other virtual machines may have a high tolerance to a non-optimal allocation of the hardware resources.

Additionally, each virtual machine may be assigned a priority, for example, by an administrator of the virtualized information handling system. The priority may be used to prioritize allocation of the hardware resources among virtual machines instantiated on the virtualized information handling system, along with the tolerance to the non-optical hardware resource allocation discussed above. In some instances, priority may be weighted greater than the tolerance, while in other instances the tolerance may have greater weight than the priority, when allocating the hardware resources specified in the workload policy, or when modifying the workload policy.

Figure 3A:
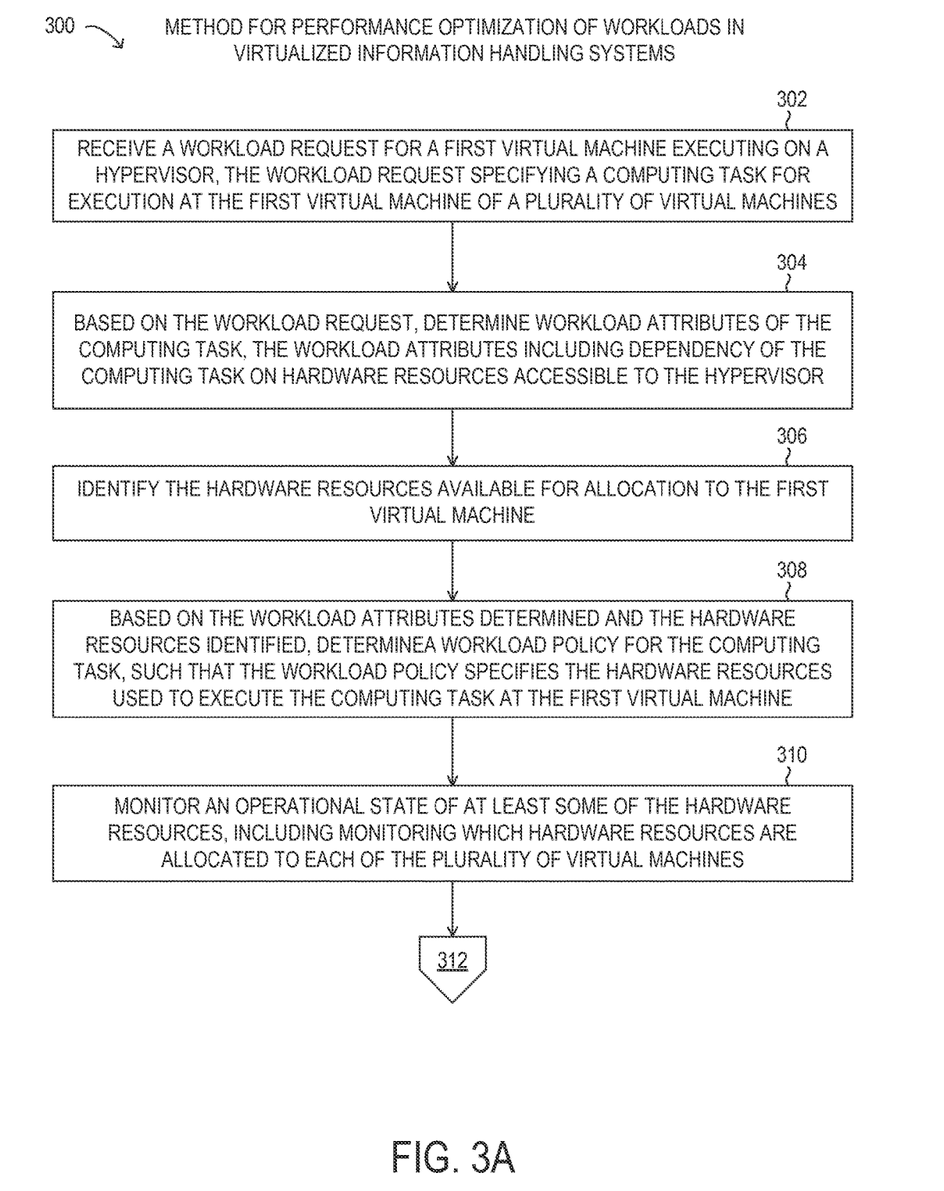
FIGS. 3A and 3B are a flowchart depicting selected elements of an embodiment of a method for performance optimization of workloads in virtualized information handling systems, as described herein.
Figure 3B:
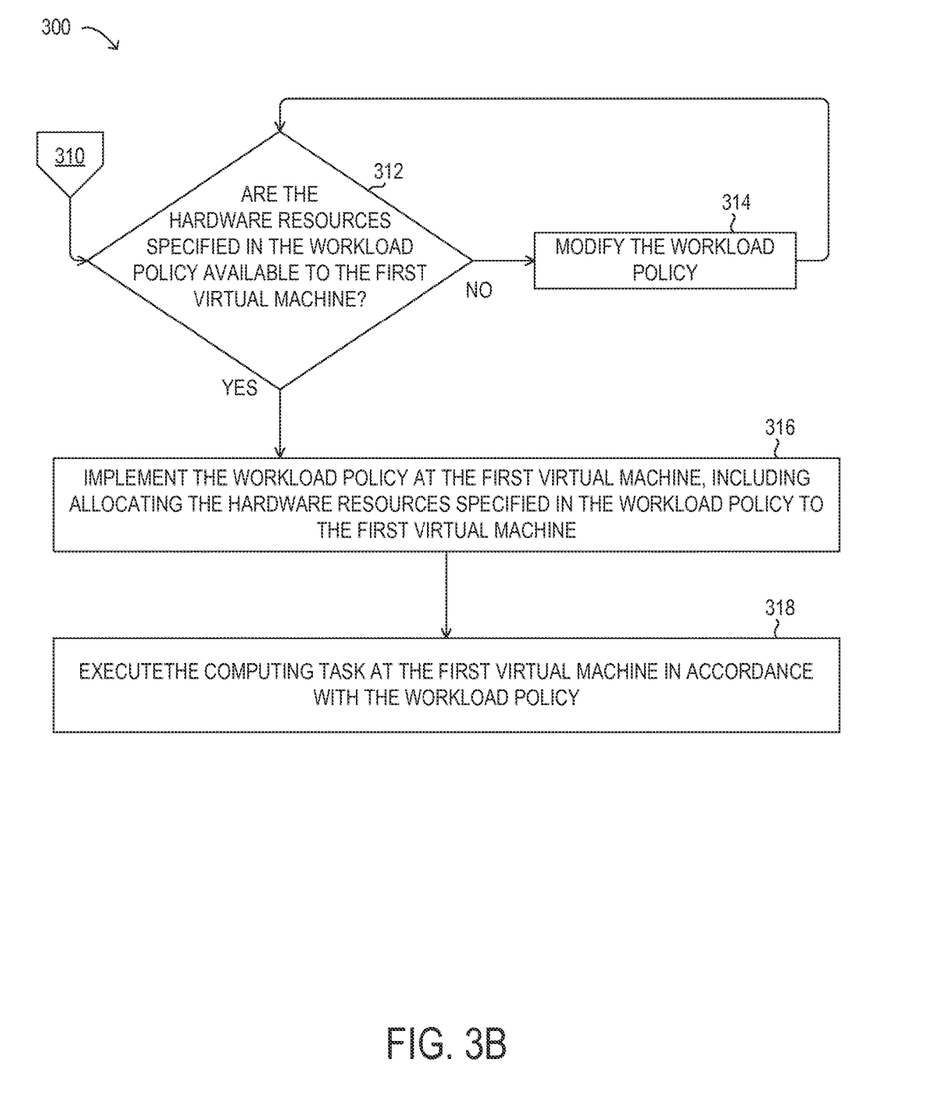

Referring now to FIGS. 3A and 3B, selected elements of an embodiment of method 300 for performance optimization of workloads in virtualized information handling systems, as described herein, are depicted in flowchart form. Method 300 may be performed using VM workload optimizer 136 and VM analyzer 132 on virtualized information handling system 100 executing hypervisor 104 that instantiates N number of virtual machines 105 (see FIG. 1). It is noted that certain operations described in method 300 may be optional or may be rearranged in different embodiments.

In FIG. 3A, method 300 may begin by receiving (operation 302) a workload request for a first virtual machine executing on a hypervisor executing on a virtualized information handling system, the workload request specifying a computing task for execution at the first virtual machine. The request in operation 302 may be generated by a user of the first virtual machine, for example, to activate performance optimization of workloads. The request in operation 302 may be generated by VM analyzer 132 when performance optimization of workloads has been installed or configured at the first virtual machine. Based on the workload request, workload attributes of the computing task may be determined (operation 304), the workload attributes including dependency of the computing task on hardware resources accessible to the hypervisor. Then, the hardware resources available for allocation to the first virtual machine may be identified (operation 304). Based on the workload attributes determined and the hardware resources identified, a workload policy for the computing task may be determined (operation 306), such that the workload policy specifies the hardware resources used to execute the computing task at the first virtual machine. An operational state of at least some of the hardware resources may be monitored (operation 308), including monitoring which hardware resources are allocated to each of the plurality of virtual machines, such that the instructions to allocate the hardware resources are executed based on the operational state. Then, method 300 may continue with operation 312 in FIG. 3B.

In FIG. 3B, a decision may be made whether the hardware resources specified in the workload policy are available (operation 312) to the first virtual machine. Operation 312 may be based on the operational state of at least some of the hardware resources. When the result of operation 312 is NO, the workload policy may be modified (operation 314). The workload policy may be modified in operation 314 according to the operational state. The workload policy may be modified in operation 314 based on a priority assigned to the first virtual machine. The workload policy may be modified in operation 314 based on a tolerance of the first virtual machine to variances in the dependency of the computing task on the hardware resources. After operation 314, method 300 may loop back to operation 312. When the result of operation 312 is YES, the workload policy may be implemented (operation 316) at the first virtual machine, including allocating the hardware resources specified in the workload policy to the first virtual machine. Then, the computing task may be executed (operation 318) at the first virtual machine in accordance with the workload policy.

As described in herein, disclosed methods and systems for performance optimization of workloads in virtualized information handling systems may analyze a workload at a virtual machine executing on a hypervisor. A workload policy specifying hardware resources for allocation to the virtual machine may be generated. After allocation of the hardware resources to the virtual machine, the workload may be executed on the virtual machine. The hypervisor may prioritize hardware resources among a plurality of virtual machines.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for optimizing workloads on virtualized information handling systems, the method comprising:
   receiving a workload request for a first virtual machine executing on a hypervisor executing on a virtualized information handling system, wherein the workload request specifies a computing task for execution at the first virtual machine, and wherein the hypervisor executes a plurality of virtual machines, including the first virtual machine;
   based on the workload request, determining workload attributes of the computing task, the workload attributes including dependency of the computing task on hardware resources accessible to the hypervisor;
   identifying the hardware resources available for allocation to the first virtual machine;
   based on the workload attributes determined and the hardware resources identified, determining a workload policy for the computing task, wherein the workload policy specifies the hardware resources used to execute the computing task at the first virtual machine;
   implementing the workload policy at the first virtual machine, including allocating the hardware resources specified in the workload policy to the first virtual machine; and
   executing the computing task at the first virtual machine in accordance with the workload policy,
   wherein the allocating the hardware resources includes:
   accessing a basic input/output system (BIOS) of the virtualized information handling system; and
   based on the workload policy, modifying the hardware resources using the BIOS.

2. The method of claim 1, wherein the allocating the hardware resources further includes:
   accessing respective hardware drivers for the hardware resources, the hardware drivers installed in the hypervisor; and
   based on the workload policy, modifying the hardware resources using the hardware drivers.

3. The method of claim 1, wherein the workload request further specifies an application executing on the first virtual machine associated with the computing task, and wherein the workload attributes are selected from at least one of:
   a degree of multithreading used by the computing task;
   a thread priority used by the computing task;
   an instruction set architecture used by the computing task;
   a memory capacity used by the computing task;
   a memory data throughput used by the computing task;
   a memory cache capacity used by the computing task;
   a memory cache architecture used by the computing task;
   a degree of non-uniform memory access permitted by the computing task;
   a network latency permitted by the computing task;
   a storage capacity used by the computing task;
   a storage data throughput used by the computing task;
   a storage latency permitted by the computing task;
   a vertical synchronization setting permitted by the computing task;
   a degree of digital signal processing used by the computing task;
   a degree of integer processing used by the computing task;
   a degree of background execution permitted by the computing task; and
   an operating system used by the computing task.

4. The method of claim 1, further comprising:
   monitoring an operational state of at least some of the hardware resources, including monitoring which hardware resources are allocated to each of the plurality of virtual machines, wherein the allocating the hardware resources is performed based on the operational state.

5. The method of claim 4, further comprising:
   when the operational state of at least some of the hardware resources indicates that the hardware resources specified in the workload policy are not available to the first virtual machine, modifying the workload policy according to the operational state.

6. The method of claim 5, wherein modifying the workload policy is based on at least one of:
   a priority assigned to the first virtual machine; and
   a tolerance of the first virtual machine to variances in the dependency of the computing task on the hardware resources.

7. The method of claim 1, wherein allocating the hardware resources includes modifying at least some of the hardware resources, and wherein the hardware resources are selected from at least one of:
   a number of processor cores available;
   a degree of exclusive access to processor cores available;
   a degree of processor multithreading available;
   a degree of background execution available;
   a degree of user mode execution available;
   a processor frequency;
   a processor architecture;
   a processor cache architecture;
   a processor power state;
   a processor cache capacity available;
   a processor power consumption available;
   an instruction set architecture available;
   a graphics processing unit available;
   a memory capacity available;
   a memory throughput available;
   a degree of non-uniform memory access available;
   a storage capacity available;

a storage throughput available;
a storage latency available;
a network capacity available;
a network throughput available;
a network latency available;
a system reboot feature; and
a system power down feature.

8. At least one non-transitory computer readable medium, comprising computer readable instructions for optimizing workloads on virtualized information handling systems, the instructions, when executed, cause a processor to:
   receive a workload request for a first virtual machine executing on a hypervisor executing on a virtualized information handling system, wherein the workload request specifies a computing task for execution at the first virtual machine, and wherein the hypervisor executes a plurality of virtual machines, including the first virtual machine;
   based on the workload request, determine workload attributes of the computing task, the workload attributes including dependency of the computing task on hardware resources accessible to the hypervisor;
   identify the hardware resources available for allocation to the first virtual machine;
   based on the workload attributes determined and the hardware resources identified, determine a workload policy for the computing task, wherein the workload policy specifies the hardware resources used to execute the computing task at the first virtual machine;
   implement the workload policy at the first virtual machine, including instructions to allocate the hardware resources specified in the workload policy to the first virtual machine; and
   execute the computing task at the first virtual machine in accordance with the workload policy,
wherein the instructions to allocate the hardware resources include instructions to:
   access a basic input/output system (BIOS) of the virtualized information handling system; and
   based on the workload policy, modify the hardware resources using the BIOS.

9. The computer readable medium of claim 8, wherein the instructions to allocate the hardware resources further include instructions to:
   access respective hardware drivers for the hardware resources, the hardware drivers installed in the hypervisor; and
   based on the workload policy, modify the hardware resources using the hardware drivers.

10. The computer readable medium of claim 8, wherein the workload request further specifies an application executing on the first virtual machine associated with the computing task, and wherein the workload attributes are selected from at least one of:
   a degree of multithreading used by the computing task;
   a thread priority used by the computing task;
   an instruction set architecture used by the computing task;
   a memory capacity used by the computing task;
   a memory data throughput used by the computing task;
   a memory cache capacity used by the computing task;
   a memory cache architecture used by the computing task;
   a degree of non-uniform memory access permitted by the computing task;
   a network latency permitted by the computing task;
   a storage capacity used by the computing task;
   a storage data throughput used by the computing task;
   a storage latency permitted by the computing task;
   a vertical synchronization setting permitted by the computing task;
   a degree of digital signal processing used by the computing task;
   a degree of integer processing used by the computing task;
   a degree of background execution permitted by the computing task; and
   an operating system used by the computing task.

11. The computer readable medium of claim 8, further comprising instructions to:
   monitor an operational state of at least some of the hardware resources, including monitoring which hardware resources are allocated to each of the plurality of virtual machines, wherein the instructions to allocate the hardware resources are executed based on the operational state.

12. The computer readable medium of claim 11, further comprising instructions to:
   when the operational state of at least some of the hardware resources indicates that the hardware resources specified in the workload policy are not available to the first virtual machine, modify the workload policy according to the operational state.

13. The computer readable medium of claim 12, wherein the instructions to modify the workload policy are based on at least one of:
   a priority assigned to the first virtual machine; and
   a tolerance of the first virtual machine to variances in the dependency of the computing task on the hardware resources.

14. The computer readable medium of claim 8, wherein the instructions to allocate the hardware resources include instructions to modify at least some of the hardware resources, and wherein the hardware resources are selected from at least one of:
   a number of processor cores available;
   a degree of exclusive access to processor cores available;
   a degree of processor multithreading available;
   a degree of background execution available;
   a degree of user mode execution available;
   a processor frequency;
   a processor architecture;
   a processor cache architecture;
   a processor power state;
   a processor cache capacity available;
   a processor power consumption available;
   an instruction set architecture available;
   a graphics processing unit available;
   a memory capacity available;
   a memory throughput available;
   a degree of non-uniform memory access available;
   a storage capacity available;
   a storage throughput available;
   a storage latency available;
   a network capacity available;
   a network throughput available;
   a network latency available;
   a system reboot feature; and
   a system power down feature.

15. A virtualized information handling system for optimizing workloads, comprising:
   a processor;
   a memory communicatively coupled to the processor; and
   a workload optimizer stored in the memory and including computer readable instructions that,
      when executed, cause the processor to:

receive a workload request for a first virtual machine executing on a hypervisor executing on the virtualized information handling system, wherein the workload request specifies a computing task for execution at the first virtual machine, and wherein the hypervisor executes a plurality of virtual machines, including the first virtual machine;

based on the workload request, determine workload attributes of the computing task, the workload attributes including dependency of the computing task on hardware resources accessible to the hypervisor;

identify the hardware resources available for allocation to the first virtual machine;

based on the workload attributes determined and the hardware resources identified, determine a workload policy for the computing task, wherein the workload policy specifies the hardware resources used to execute the computing task at the first virtual machine;

implement the workload policy at the first virtual machine, including instructions to allocate the hardware resources specified in the workload policy to the first virtual machine; and execute the computing task at the first virtual machine in accordance with the workload policy, wherein the instructions to allocate the hardware resources include instructions to:

access a basic input/output system (BIOS) of the virtualized information handling system; and based on the workload policy, modify the hardware resources using the BIOS.

16. The virtualized information handling system of claim 15, wherein the instructions to allocate the hardware resources further include instructions to:

access respective hardware drivers for the hardware resources, the hardware drivers installed in the hypervisor; and based on the workload policy, modify the hardware resources using the hardware drivers.

17. The virtualized information handling system of claim 15, wherein the workload request further specifies an application executing on the first virtual machine associated with the computing task, and wherein the workload attributes are selected from at least one of:

a degree of multithreading used by the computing task;
a thread priority used by the computing task;
an instruction set architecture used by the computing task;
a memory capacity used by the computing task;
a memory data throughput used by the computing task;
a memory cache capacity used by the computing task;
a memory cache architecture used by the computing task;
a degree of non-uniform memory access permitted by the computing task;
a network latency permitted by the computing task;
a storage capacity used by the computing task;
a storage data throughput used by the computing task;
a storage latency permitted by the computing task;
a vertical synchronization setting permitted by the computing task;
a degree of digital signal processing used by the computing task;
a degree of integer processing used by the computing task;
a degree of background execution permitted by the computing task; and
an operating system used by the computing task.

18. The virtualized information handling system of claim 15, further comprising instructions to:

monitor an operational state of at least some of the hardware resources, including monitoring which hardware resources are allocated to each of the plurality of virtual machines, wherein the instructions to allocate the hardware resources are executed based on the operational state; and when the operational state of at least some of the hardware resources indicates that the hardware resources specified in the workload policy are not available to the first virtual machine, modify the workload policy according to the operational state.

19. The virtualized information handling system of claim 18, wherein the instructions to modify the workload policy are based on at least one of:

a priority assigned to the first virtual machine; and
a tolerance of the first virtual machine to variances in the dependency of the computing task on the hardware resources.

20. The virtualized information handling system of claim 19, wherein the instructions to allocate the hardware resources include instructions to modify at least some of the hardware resources, and wherein the hardware resources are selected from at least one of:

a number of processor cores available;
a degree of exclusive access to processor cores available;
a degree of processor multithreading available;
a degree of background execution available;
a degree of user mode execution available;
a processor frequency;
a processor architecture;
a processor cache architecture;
a processor power state;
a processor cache capacity available;
a processor power consumption available;
an instruction set architecture available;
a graphics processing unit available;
a memory capacity available;
a memory throughput available;
a degree of non-uniform memory access available;
a storage capacity available;
a storage throughput available;
a storage latency available;
a network capacity available;
a network throughput available;
a network latency available;
a system reboot feature; and
a system power down feature.

* * * * *